United States Patent
Dayi et al.

(10) Patent No.: US 10,754,027 B2
(45) Date of Patent: Aug. 25, 2020

(54) METHOD FOR GENERATING AN IMAGE AND HANDHELD SCREENING DEVICE

(71) Applicant: SONY CORPORATION, Tokyo (JP)

(72) Inventors: Furkan Dayi, Stuttgart (DE); Ralf Boehnke, Esslingen (DE); Miquel Testar, Stuttgart (DE); Marcel Blech, Herrenberg (DE); Qi Wang, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 1094 days.

(21) Appl. No.: 14/437,375

(22) PCT Filed: Oct. 9, 2013

(86) PCT No.: PCT/EP2013/003035
§ 371 (c)(1),
(2) Date: Apr. 21, 2015

(87) PCT Pub. No.: WO2014/094927
PCT Pub. Date: Jun. 26, 2014

(65) Prior Publication Data
US 2015/0268339 A1 Sep. 24, 2015

(30) Foreign Application Priority Data
Dec. 19, 2012 (EP) .................................. 12008453

(51) Int. Cl.
*G01S 13/89* (2006.01)
*G01S 7/24* (2006.01)
(Continued)

(52) U.S. Cl.
CPC ............... *G01S 13/89* (2013.01); *G01S 7/24* (2013.01); *G01S 13/86* (2013.01); *G01S 13/887* (2013.01)

(58) Field of Classification Search
CPC ....... G01S 13/888; G01S 13/887; G01S 13/89
(Continued)

(56) References Cited

U.S. PATENT DOCUMENTS 6,359,582 B1 * 3/2002 MacAleese ............. G01S 7/417
342/192
6,417,797 B1 * 7/2002 Cousins .................. G06F 15/02
342/175

(Continued)

FOREIGN PATENT DOCUMENTS

CN 101793963 A 8/2010
CN 102707309 A 10/2012
(Continued)

OTHER PUBLICATIONS

Combined Office Action and Search Report dated Jul. 5, 2016 in Chinese Patent Application No. 201380065695.5 (with English translation of category of cited documents).
(Continued)

*Primary Examiner* — Marcus E Windrich
(74) *Attorney, Agent, or Firm* — Xsensus LLP

(57) ABSTRACT

A method and device for generating an image, the method including: generating an active radar image of an object; displaying the active radar image in a first representation on a display of a handheld screening device; detecting a movement of the handheld screening device; generating a second representation of the displayed radar image based on the detected movement.

10 Claims, 3 Drawing Sheets

(51) Int. Cl.
*G01S 13/86* (2006.01)
*G01S 13/88* (2006.01)

(58) Field of Classification Search
USPC .......................................... 342/22, 176, 191
See application file for complete search history.

(56) References Cited

U.S. PATENT DOCUMENTS

| | | | |
|---|---|---|---|
| 7,973,704 B2 | 7/2011 | Storz et al. | |
| 8,068,049 B2 | 11/2011 | Salmon et al. | |
| 9,207,315 B1* | 12/2015 | Plautz | G01S 13/885 |
| 2005/0046615 A1* | 3/2005 | Han | G01C 21/36 |
| | | | 342/357.31 |
| 2009/0167593 A1* | 7/2009 | Storz | G01S 7/24 |
| | | | 342/133 |
| 2009/0295618 A1* | 12/2009 | Beeri | G01S 13/89 |
| | | | 342/22 |
| 2010/0117885 A1* | 5/2010 | Holbrook | G01S 7/03 |
| | | | 342/22 |
| 2010/0302240 A1* | 12/2010 | Lettvin | G01S 3/784 |
| | | | 345/419 |
| 2011/0227778 A1* | 9/2011 | Mohamadi | G01S 13/888 |
| | | | 342/22 |
| 2011/0243476 A1* | 10/2011 | Sieracki | G01V 3/15 |
| | | | 382/291 |
| 2015/0301167 A1* | 10/2015 | Sentelle | G01S 13/888 |
| | | | 342/22 |

FOREIGN PATENT DOCUMENTS

| | | |
|---|---|---|
| CN | 102707309 B | 10/2012 |
| EP | 0 009 856 A1 | 4/1980 |
| JP | 7-301669 A | 11/1995 |

OTHER PUBLICATIONS

"XAVER TM 800 High Performance ISR Through-Wall Imaging System", CAMERO-Tech Ltd., (2013), (Total pp. 2).
International Search Report dated Jan. 15, 2014 in PCT/EP2013/003035 Filed Oct. 9, 2013.

* cited by examiner

METHOD FOR GENERATING AN IMAGE AND HANDHELD SCREENING DEVICE

CROSS-REFERENCE TO RELATED APPLICATIONS

The present application is based on PCT/EP2013/003035 filed Oct. 9, 2013, and claims priority to European Patent Application 12008453.8, filed in the European Patent Office on Dec. 19, 2012, the entire contents of each of which being incorporated herein by reference.

BACKGROUND

Field of the Disclosure

The present disclosure relates to a method for generating an image and a handheld screening device.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A variety of conventional systems are available for obtaining images through visibly opaque materials. For example, X-ray systems have been utilized to acquire images of objects that are hidden from visual inspection by visibly opaque materials (e.g., anatomical structures or objects within a luggage). X-ray systems, however, have many disadvantages. By way of example, such systems can be expensive and bulky, and can utilize ionizing radiation that may pose health hazards to humans. Moreover, X-ray systems typically detect a beam that has been transmitted through a target sample, thus requiring access to both sides of the target. Ultrasound imaging systems, in turn, require the presence of a continuous, high quality acoustic transmission path between a transducer and a "hidden" object of interest. In many cases, however, such acoustic transmission paths may be not available.

Millimeter-wave imaging systems have recently been developed for securing screening applications. Millimeter-waves are particular useful for detecting objects in an active radar system, i.e. by emitting electromagnetic waves in the millimeter-wavelength region and detecting reflected or scattered electromagnetic waves.

There is a need to further improve the usability of handheld screening apparatus based on millimeter-wave imaging systems.

SUMMARY

A method for generating an image is provided including generating an active radar image of an object; displaying the active radar image in a first representation on a display of a handheld screening device; detecting a movement of the handheld screening device; generating a second representation of the displayed radar image based on the detected movement.

Further, a handheld screening apparatus is provided including an active radar scan unit to generate an active radar image of an object; a display to display the active radar image in a first representation; a movement sensor to detect a movement of the handheld screening device; and a processor to generate a second representation of the active radar image to be displayed on the display based on the movement.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
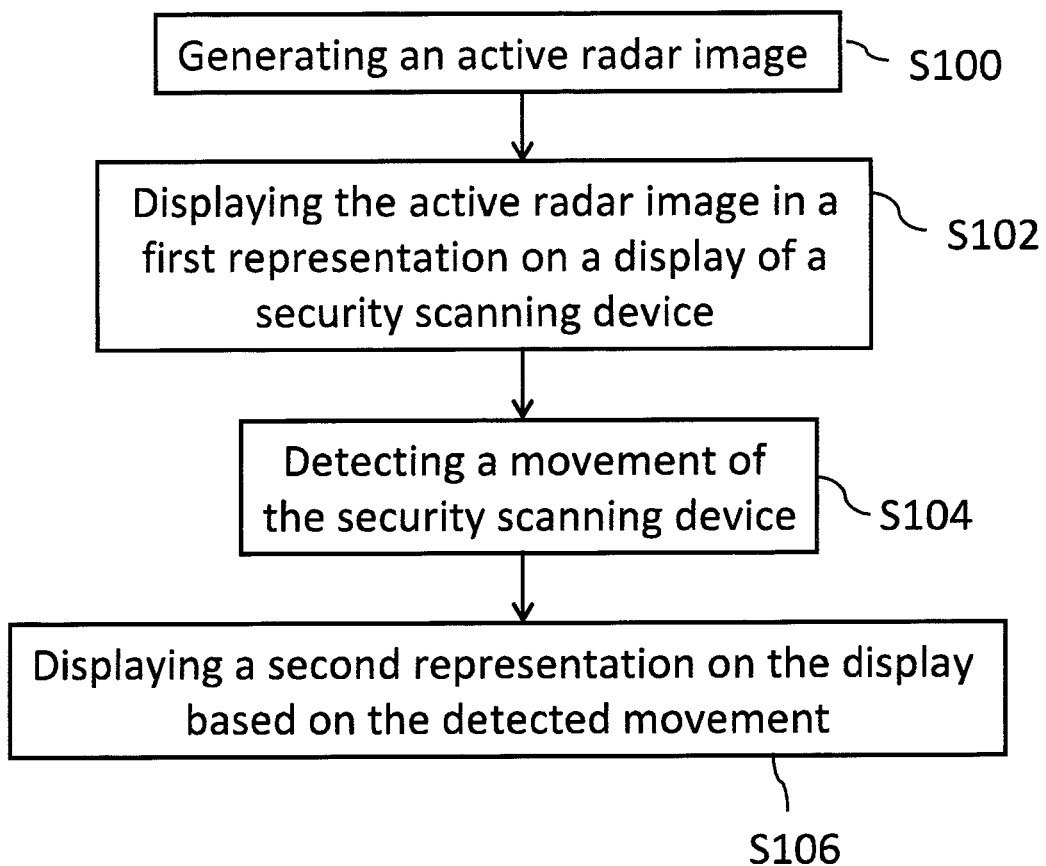
FIG. 1 shows schematically method steps according to an embodiment of the invention.

Referring now to the drawings, wherein like reference numerals designate identical or corresponding parts throughout the several views, FIG. 1 depicts steps of a method for generating an image according to an embodiment of the invention.

In a step S100 an active radar image is generated. An active radar image can be taken e.g. by an active millimeter-wave sensor or a radar scan sensor. The active radar image is generated by emitting radar waves from a radar source, e.g. a handheld screening device or an active radar scan unit to an object and detecting electromagnetic waves scattered back from the object. "Detecting" might include capturing of the scattered electromagnetic waves by an antenna and radio frequency electronics followed by analogue-to-digital conversion and digital processing and analysis. In order to get a one- or two-dimensional image, either the radar source and the object have to be moved with respect to each other or the radar beam is electronically moved across the surface of an object in one or two dimensions. It is possible to move the radar source or to change the emission direction of the radar electromagnetic wave e.g. by a moving reflector, a grating or an electronic beamforming method.

An active radar image is formed by emitting and receiving reflected/scattered electromagnetic radiation in an extended millimeter wavelength region. The frequency of the millimeter wavelength region radiation is considered to be within 10 GHz to 500 GHz.

The term "image" as used throughout the description includes any information (reflectivity, depth, shape, contours, polarimetric scattering, polarization change etc.) that can be derived from evaluating the reflected or scattered electromagnetic waves.

The term "handheld" used throughout the description might be understood to describe a device that can be carried (i.e. it is mobile) and operated by one or two hands and has preferably a weight less than 3 kg. A "handheld" device should approximately have geometrical dimensions (height, width, length) and weight as objects that are normally operated and/or carried by a person using one hand or two hands. Examples for such objects are a book, a smart phone, a cellular phone, an electronic reader, a tablet computer, a notebook computer, a stand still camera, a video camera, binoculars etc. Nevertheless, it should be understood that the device itself might be suited to be handheld, but in a particular application is mounted on a tripod or is otherwise fixed to a support when a stationary use of the device is envisaged.

In step S102 a first representation of the active radar image is displayed on a display of a handheld screening device, for instance, a handheld screening device 200.

A movement of the handheld screening device 200 is detected in step S104.

Then in a step S106 a second representation of the active radar image is generated based on the detected movement. The second representation might be displayed on the display afterwards.

The first and second representations of the active radar image are based on the same data of the active radar image but might e.g. show different field of views. When the active radar image is generated and stored, different regions of the image can be displayed as different representations of the active radar image. For instance, when the handheld screening device is moved towards the object, then an enlarged part of the active radar image is displayed, wherein the enlarged part of the active radar image that is displayed depends on the amount of movement and on the direction of the movement.

Figure 2:
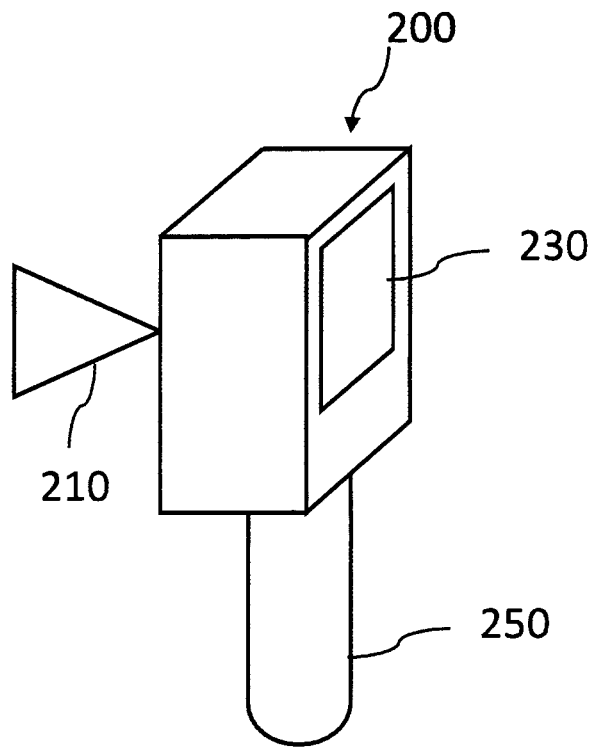
FIG. 2 shows schematically a perspective view of a handheld screening device according to an embodiment of the invention.
Figure 3:
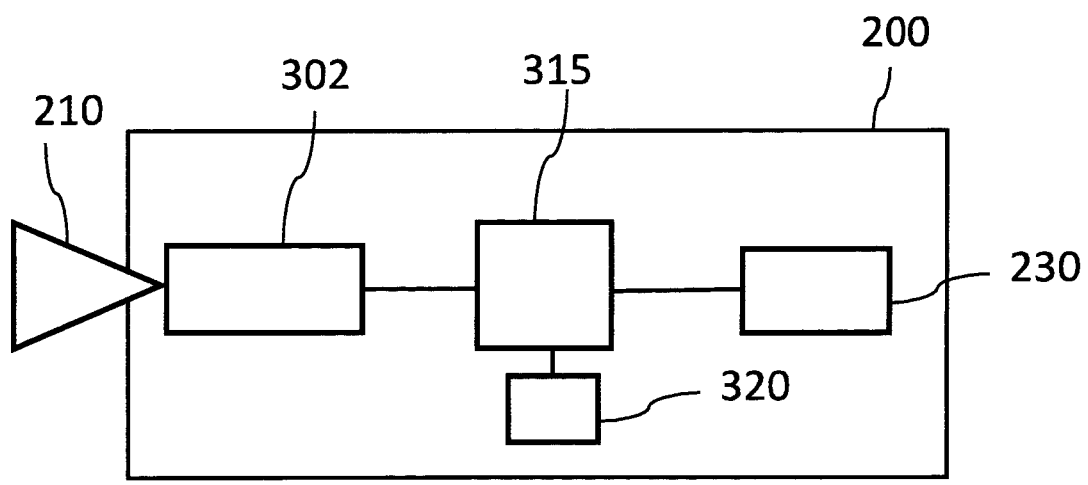
FIG. 3 shows schematically a block diagram of a handheld screening device according to an embodiment of the invention.

FIG. 2 depicts a perspective view and in FIG. 3 a schematic block diagram of a handheld screening device 200 is depicted.

The handheld screening device 200 includes an active radar scan unit 302 adapted to emit a radar signal and to receive reflected radar signals, which might be emitted in a cone form 210. Consequently, the active radar scan unit 302 is adapted to generate an active radar image of an object.

The handheld screening device further includes a display 230, e.g. a screen, adapted to display the active radar image in the first representation.

A grip 250 is provided so that a user can hold the handheld screening device 200 with one hand and can operate it easily.

Further, a position sensor 320 for one, two or three axes and/or for detecting rotational movements is integrated, e.g. an accelerometer, a rotation sensor, a gyroscope, an inertial sensor etc. The position sensor 320 is adapted to detect a movement of the handheld screening device 200 (which might operate using an FMCW (frequency modulated continuous wave) or stepped frequency CW radar method). Some additional infrastructure might be provided, for instance at least four transmitters located in a room, in which the screening device is operated. By evaluating the time delay or the phase difference of the four signals received by the device, its position can be determined. In case three receivers exhibiting three different receiving antenna positions are built in, also its orientation can be detected.

A processor 315 is included into the handheld screening device 200, which controls the active radar scan unit 302 and is configured to generate the second representation of the active radar image based on the detected movement.

The handheld screening device 200 might further use the display 230 to display the third image.

Figure 4:
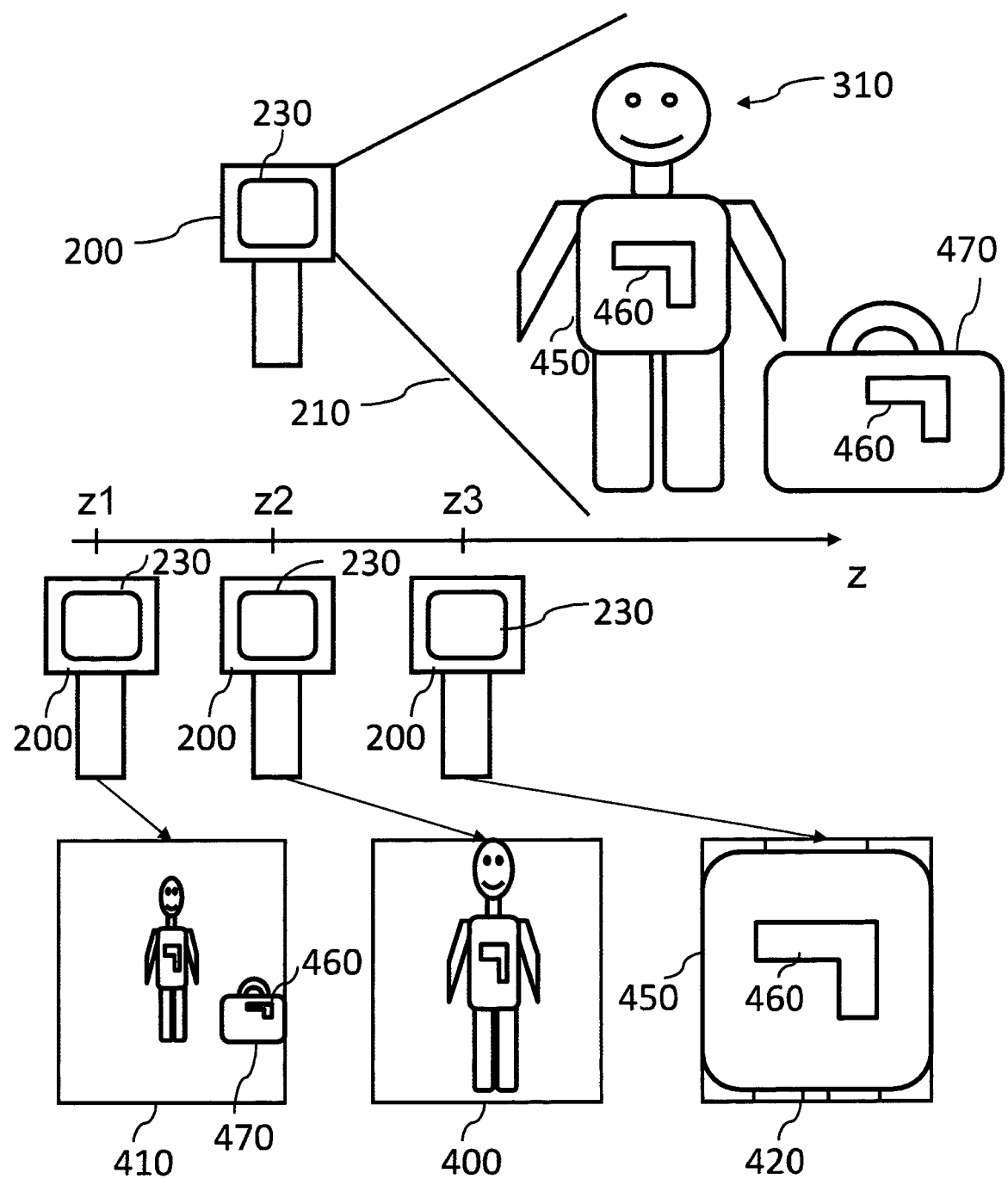
FIG. 4 shows schematically generating a second representation of an image based on a movement of the handheld screening device.

In FIG. 4 the method is explained exemplarily by referring to a security application. In order to detect dangerous devices, e.g. arms like pistols, guns, knives, etc. or other devices with a characteristic shape, e.g. bottles with liquids, the handheld screening device 200 is used. Of course, the method can be equally applied to search for other devices/items that can be hidden. Whereas it should be understood that the devices/items might be searched for due to security reasons (dangerous items such as weapons), it is equally well possible that the devices/items should be identified due to other reasons, for instance, an organizer of a festival is searching for bottles of liquids (an 'unwanted item' in such a scenario), since he wants to forbid bringing such bottles into the festival, because he wants to sell his own products.

An active radar image of objects, here a person 310 and a suitcase 470, is taken by a handheld screening device 200.

The objects can include human beings wearing clothes, suitcases or boxes or any other object that can be used to hide a device as described hereinbefore.

The distance of the person to the handheld screening device 200 in the z-direction determines together with a radiation pattern of the transmitter antenna the region of the active radar image that is covered by the handheld screening device 200. The active radar image is stored in the handheld screening device 200, e.g. in a memory and displayed in a first representation 400 on the display 230 of the handheld screening device 200.

The distance from the handheld screening device 200 to the person 310 is referred to in FIG. 4 with z2.

After the active radar image has been taken and is displayed in the first representation 400 on the display 230, the handheld screening device 200 is moved in relation to the person 310.

This movement can be detected by the position sensor 320 as described above. If the position sensor 320 detects a movement towards the person 310, e.g. to a second position z3, then a second representation 420 of the active radar image is generated and displayed on the display 230. The second representation is an enlarged view of a part of the active radar image, e.g. as depicted in FIG. 4, the body region 450 of the person 310, which corresponds to a smaller field of view. However, due to the enlarged view, it is easier to visualize a hidden object.

In the example depicted in FIG. 4 the person 310 has hidden a gun 460, e.g. below clothes. Whereas it might be difficult to identify the gun 460 in the first representation 400, it is easier to identify the gun 460 in the second enlarged representation 420 than in the first representation 400.

A further alternative is to generate the second representation to encompass a larger field of view when moving the handheld screening device to a position z1 that is located further away from the person 310. This might be helpful if, for instance, in the first representation 400 certain parts of the active radar image that might be interesting are not visible. This is exemplarily shown in FIG. 4 by the suitcase 470 with a hidden gun 460 that is visible in the further representation 410, but not in the first representation 400.

Of course, it is also possible to generate further representations of the active radar image that correspond to a lateral movement of the handheld screening device 200. For instance, if the region that is enlarged in the second representation 420 is not interesting, but instead another region should be observed more carefully (e.g. the suitcase 470 depicted in FIG. 4), then the handheld screening device 200 could be moved to the right and the second representation is then an enlarged view of the suitcase 470.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method performed by a handheld screening device for generating an image, the method comprising:
   generating, by an active radar scanner of the handheld screening device, an active radar image of an object;
   displaying a first representation of the active radar image on a display of the handheld screening device;
   detecting, by a movement sensor of the handheld screening device, a movement of the handheld screening device;
   generating, by a processor of the handheld screening device, a second representation of the active radar image based on the detected movement; and
   displaying the second representation of the active radar image on the display of the handheld screening device, wherein
   a smaller field of view of the active radar image is displayed as the second representation if the movement is a movement towards the object.

2. The method according to claim 1, wherein a larger field of view of the active radar image is displayed as the second representation if the movement is a movement away from the object.

3. The method according to claim 1, wherein a laterally shifted field of view is displayed as the second representation if the movement is a lateral movement with regard to the object.

4. A handheld screening device comprising:
   an active radar scanner to generate an active radar image of an object;
   a display to display a first representation of the active radar image;
   a movement sensor to detect a movement of the handheld screening device; and
   a processor to generate a second representation of the active radar image to be displayed on the display based on the movement, wherein
   a smaller field of view of the active radar image is displayed as the second representation if the movement is a movement towards the object.

5. A handheld screening device according to claim 4, wherein a larger field of view of the active radar image is displayed as the second representation if the movement is a movement away from the object.

6. A handheld screening device according to claim 4, wherein a laterally shifted field of view is displayed as the second representation if the movement is a lateral movement with regard to the object.

7. A handheld screening device comprising:
   an active radar scanner configured to generate an active radar image of an object;
   a display to display a first representation of the active radar image;
   a movement sensor configured to detect a movement of the handheld screening device;
   a processor configured to
      determine a direction of movement of the handheld screening device in relation to the object based on an output of the movement sensor;
      generate a second representation of the active radar image based on the determined direction of movement, wherein the second representation has a smaller field of view than the first representation when it is determined that the movement is towards the object, and the second representation has a larger field of view than the first representation when it is determined that the movement is away from the object; and
      control the display to display the second representation.

8. The handheld screening device according to claim 7, wherein the processor is configured to generate the second representation without the active radar scanner generating another active radar image of the object.

9. The method according to claim 1, wherein the second representation is generated without the active radar scanner generating another active radar image of the object.

10. The handheld screening device according to claim 4, wherein the processor is configured to generate the second representation without the active radar scanner generating another active radar image of the object.

* * * * *